Figure 1:
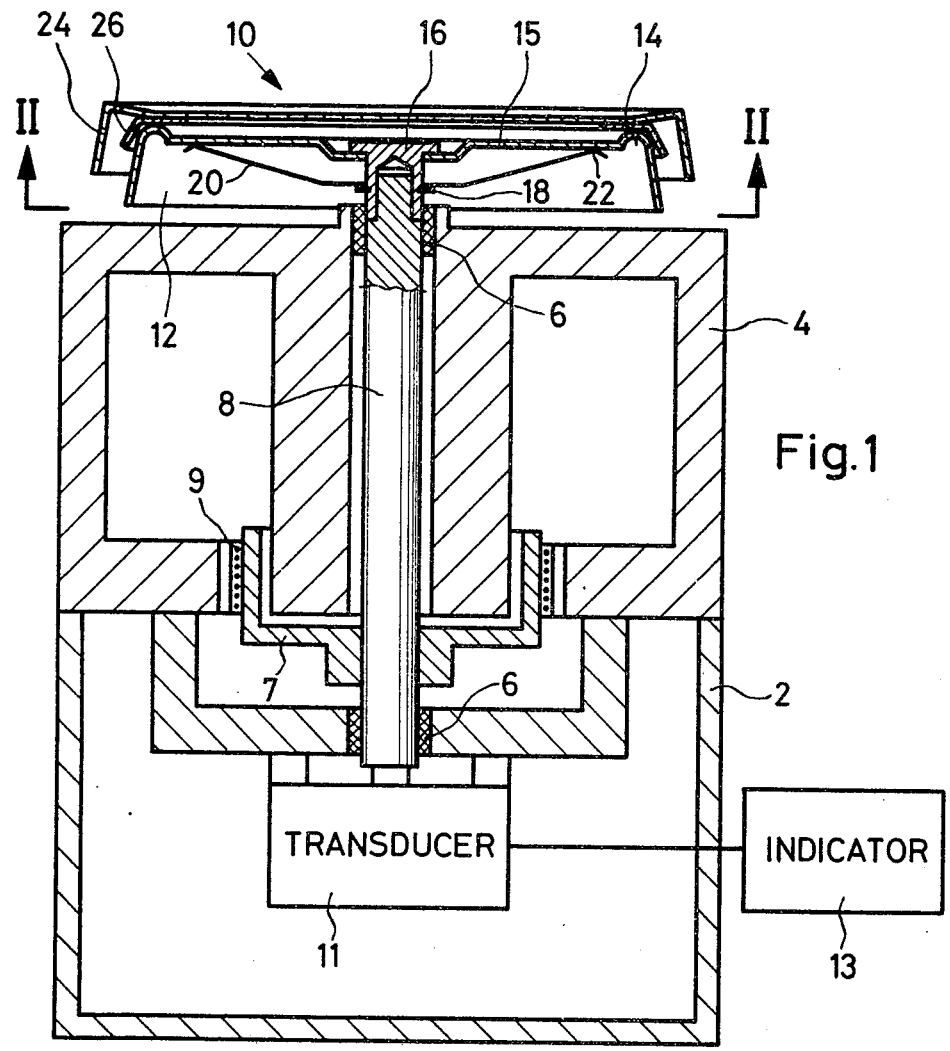

United States Patent [19]

Kunz

[11] 3,973,637
[45] Aug. 10, 1976

[54] PRECISION BALANCE WITH RESILIENTLY MOUNTED WEIGHING PAN

[75] Inventor: Peter Kunz, Meilen, Switzerland

[73] Assignee: Mettler Instruments AG, Greifensee-Zurich, Switzerland

[22] Filed: Sept. 24, 1975

[21] Appl. No.: 616,425

[30] Foreign Application Priority Data
Apr. 15, 1975 Switzerland.............................4780/75

[52] U.S. Cl. .............................................. 177/189
[51] Int. Cl.² ...................................... G01G 21/22
[58] Field of Search ............ 177/184, 189, 154, 187

[56] References Cited
UNITED STATES PATENTS

| | | |
|---|---|---|
| 2,643,534 | 8/1953 | Mettler et al. ....................... 177/189 |
| 3,216,517 | 11/1965 | John ............................... 177/210 X |
| 3,519,095 | 7/1970 | Tomas ................................ 177/210 |
| 3,727,708 | 4/1973 | Adler et al. ...................... 177/210 X |

Primary Examiner—George H. Miller, Jr.
Attorney, Agent, or Firm—Hans Berman

[57] ABSTRACT

A single-pan precision balance in which the forces of gravity acting on the weighing pan and the object to be weighed are transmitted to an electromechanical transducer by an upright spindle is equipped with a star-shaped leaf spring whose center is mounted on the spindle and whose arms engage the periphery of the weighing pan to prevent damage to the transducer by shock loads applied to the pan. Cooperating abutments on the pan and the supporting structure of the balance prevent excessive deformation of the spring.

4 Claims, 2 Drawing Figures

U.S. Patent  Aug. 10, 1976  3,973,637

PRECISION BALANCE WITH RESILIENTLY MOUNTED WEIGHING PAN

This invention relates to precision balances, and particularly to improvements in a single-pan balance in which forces acting on the weighing pan are transmitted to an electro-mechanical transducer by a pan carrier whose movement is limited to a few millimeters, and in which the electric output signal of the transducer is converted to a perceptible signal indicative of the force transmitted from the weighing pan to the transducer.

Known balances of the afore-described type are commonly employed in laboratories and perform reliably over extended periods of time if handled carefully by competent personnel. They are readily damaged by loads dropped on the weighing pan and by other, suddenly applied forces. Abutments were provided heretofore for preventing damage to the transducer by excessive movement of the pan carrier, but such abutments cannot protect the weighing pan and its connection with the pan carrier against deformation and permanent damage. It is not practical to make all these elements heavy enough to withstand accidental overloads.

It is a primary object of this invention to provide a balance of the general type described which is protected against damage due to shock or overload applied to the weighing pan.

The balance of the invention has a pan carrier which is guided on the supporting structure of the balance in a vertical direction. Force is transmitted between a weighing pan and the pan carrier by a resilient element yieldable under the transmitted force and protected against excessive resilient deformation by cooperating abutments on the weighing pan and the supporting structure. A transducer connected to the pan carrier and the supporting structure generates an electric signal in response to movement of the pan carrier, and an indicator conductively connected to the transducer responds to the output signal of the latter to generate a perceptible signal indicative of the transmitted force, as is conventional in itself.

Figure 2:
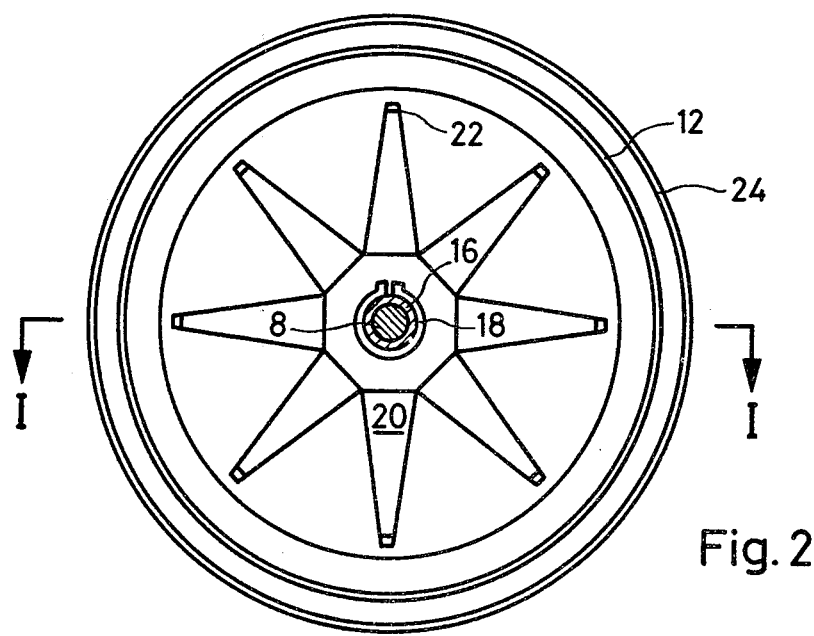

Other features, additional objects, and many of the attendant advantages of this invention will readily be appreciated as the same becomes better understood by reference to the following detailed description of a preferred embodiment when considered in connection with the appended drawing in which:

FIG. 1 shows a balance of the invention in elevational section on the line I — I in FIG. 2; and FIG. 2 is a sectional bottom plan view of the balance taken on the line II — II in FIG. 1.

Referring initially to FIG. 1, there is shown a balance of the type disclosed in Tomes Pat. No. 3,519,095. Its supporting structure includes a hollow sheet metal base 2 on which a magnet 4 is mounted. Aligned, vertical bearings 6 on the magnet 4 vertically guide a spindle 8 of circular cross section without significant friction. A cup-shaped former 7 on the spindle 8 carries a force coil 9 movably arranged in an air gap of the magnet 4 so that the spindle 8 is biased toward the illustrated position by the interaction of electric current flowing in the coil 9 and of the field of the magnet 4.

The upper end of the spindle 8 projects beyond the magnet 4 and carries a weighing pan assembly 10. The lower end of the pan-carrying spindle engages an electro-mechanical transducer 11 which senses the vertical position of the spindle 8 and transmits an electric signal to an indicator 13 in response to vertical displacement of the spindle 8, the indicator producing a perceptible signal indicative of the spindle displacement. The structure described so far, the electric circuitry associated therewith, and its operation are well known from the aforementioned patent.

This invention is more specifically concerned with the weighing pan assembly 10 and with its connection to the pancarrying spindle 8. It has a base portion 12 of aluminum alloy having the general shape of an inverted shallow dish circular about the axis of the spindle 8. The steeply frustoconical side wall of the base portion 12 extends downward from the bottom wall 15 to within a few millimeters of the horizontal top face of the magnet 4, and the bottom wall 15 bulges upward in a rounded, circular rib 14 from its juncture with the side wall. The central portion of the bottom wall 15 is offset inward of the dish cavity or downward in the illustrated position and centrally apertured.

A stud 16 having a hollow shank is received in the central aperture of the base portion 12 with sufficient clearance to guide vertical movement of the base portion 12 without significant friction. The reduced top end of the spindle 8 is received in the bore of the stud 16 and thereby coupled to the pan assembly 10. The head of the coupling stud 16 normally rests on the outer or upper face of the bottom wall 15. An annular groove circling the shank of the stud 16 near its axial midpoint receives a split retaining ring 18.

As is better seen in FIG. 2, the central portion of a star-shaped leaf spring 20 has an opening dimensioned freely to receive the shank of the stud 16, but too small to pass the retaining ring 18. The spring 20 is thus secured axially on the stud 16 between the ring 18 and the base portion 12. In the relaxed condition of the leaf spring 20, eight identical arms 22 radiate from the central spring portion in equiangular relationship in a conical configuration whose apex angle is substantially smaller than is evident from FIG. 1 in which the spring 20 is shown under compressive stress between the ring 18 engaging the central spring portion and the flat peripheral portion of the bottom wall 15 abutting against the free terminal portions of the arms 22, and being prevented from yielding under the spring pressure by the head of the stud 16.

The pan assembly 10 has a cover portion 24 having the shape of an inverted shallow dish whose exposed, upwardly directed, generally horizontal and circular face normally receives the object to be weighed. The diameter of the cover portion 24 is somewhat greater than that of the base portion 12 to protect the latter and the force transmitting connection between the base portion 12 and the spindle 8 against contamination. A downwardly flaring, frustoconical flange 26 is spot-welded to the underside of the cover portion 24 and is conformingly seated on the rib 14 so that the cover portion 24 may be lifted from the base portion 12 together with a weighed object or for cleaning purposes.

When an excessive load approximately centered in the common vertical axis of the spindle 8, the spring 20, the base portion 12, and the cover portion 24 is applied to the latter, the spring 20 is deformed by vertical compression until the side wall of the base portion 12 abuts against a cooperating annular portion of the magnet 4. The load transmitted to the spindle 8 is limited to the restoring force of the spring 20 when loaded to the limit set by the engaged abutments on the pan assembly 10 and on the supporting structure 2, 4. An accidental load applied off-center causes deformation only of the proximal arms 22, and the loading face of the cover portion 24 is tilted until the rim of the base portion 12 touches the magnet 4 and absorbs any force greater than that required for deforming the spring 20.

The spring is readily chosen for the rated capacity of the balance and the permissible displacement of the spindle 8. The vertical spacing of the abuttingly cooperating faces of the base portion 12 and of the supporting structure 2, 4 is selected according to the same parameters. The magnitude of the forces which can be applied to the balance without causing damage is limited almost exclusively by the structural strength of the supporting structure, the frustoconical side wall of the weighing pan portion 12 being well suited to withstand deformation even when of small thickness.

While the invention has been described in its application to the electromagnetic balance of the afore-mentioned patent, the weighing pan assembly and the associated force transmitting devices of the invention are equally applicable to other balances in which a pan carrier moves only a very small distance under the full rated load of the balance, and the weight of an object placed on the weighing pan is indicated by an electrically generated, perceptible signal, such as the position of an indicator on a scale, a numerical readout, or any other signal capable of being read by the senses.

It should be understood, therefore, that the foregoing disclosure relates only to a preferred embodiment of the invention, and that it is intended to cover all changes and modifications of the example of the invention chosen for the purpose of the disclosure which do not constitute departures from the spirit and scope of the invention set forth in the appended claims.

What is claimed is:

1. Weighing apparatus comprising:
   a. a support;
   b. a pan carrier member;
   c. guide means on said support for guiding movement of said carrier member in a vertical direction;
   d. a weighing pan;
   e. force transmitting means operatively interposed between said weighing pan and said carrier member for transmitting a force from said weighing pan to said carrier member, said force transmitting means including a resilient element yieldable under said force;
   f. cooperating abutment means on said weighing pan and on said support for limiting the resilient deformation of said element by said force;
   g. transducer means connected to said carrier member and to said support for generating an electrical signal in response to said movement of said carrier member; and
   h. indicating means conductively connected to said transducer means and responsive to said signal for generating a perceptible signal indicative of said force.

2. Apparatus as set forth in claim 1, wherein said weighing pan has a cover portion and a base portion respectively remote from and adjacent said pan carrier member in said direction, said cover portion having an exposed load supporting face transverse to said direction, and said base portion engaging said force transmitting means and conformingly engaging said cover portion.

3. Apparatus as set forth in claim 1, wherein said force transmitting means further include a coupling member mounted on said pan carrier member and guiding said weighing pan for relative movement in said direction, said resilient element being a leaf spring interposed between said coupling member and said weighing pan.

4. Apparatus as set forth in claim 3, wherein said leaf spring has a central portion secured to said coupling member and a plurality of arms radiating from said central portion and having respective free terminal portions, said weighing pan having a central portion aligned with the central portion of said leaf spring in said direction, and a peripheral portion, said free terminal portions engaging said peripheral portion.

* * * * *

UNITED STATES PATENT AND TRADEMARK OFFICE
CERTIFICATE OF CORRECTION

PATENT NO. : 3,973,637
DATED : August 10, 1976
INVENTOR(S) : Peter Kunz

It is certified that error appears in the above-identified patent and that said Letters Patent are hereby corrected as shown below:

In the heading, line [73], change "Mettler Instruments AG," to -- Mettler Instrumente AG, --.

Signed and Sealed this

Nineteenth Day of October 1976

[SEAL]

Attest:

RUTH C. MASON
*Attesting Officer*

C. MARSHALL DANN
*Commissioner of Patents and Trademarks*